United States Patent [19]

Gerritsen et al.

[11] Patent Number: 4,933,593

[45] Date of Patent: Jun. 12, 1990

[54] LIQUID-COOLED PROJECTION TELEVISION DISPLAY TUBE WITH EXPANSION VESSEL

[75] Inventors: Gerrit B. Gerritsen; Bernardus G. J. Weijers, both of Eindhoven, Netherlands

[73] Assignee: U.S. Philips Corporation, New York, N.Y.

[21] Appl. No.: 835,406

[22] Filed: Mar. 3, 1986

[30] Foreign Application Priority Data

Mar. 22, 1985 [NL] Netherlands ........................ 8500842

[51] Int. Cl.[5] ........................ H01J 29/86; H04N 5/74

[52] U.S. Cl. ................................ 313/35; 313/477 R; 358/250

[58] Field of Search ........................ 313/12, 22, 35, 36, 313/44, 477 R; 358/237, 250

[56] References Cited

U.S. PATENT DOCUMENTS 4,529,905 7/1985 Ohkoshi et al. ........................ 313/35
4,609,945 9/1986 Oguino ................................ 358/237

FOREIGN PATENT DOCUMENTS 3400067 7/1984 Fed. Rep. of Germany ........ 313/22
59-148250 8/1984 Japan .................................... 313/35

*Primary Examiner*—Sandra L. O'Shea
*Attorney, Agent, or Firm*—John C. Fox

[57] ABSTRACT

A projection television display tube comprising an evacuated envelope (1) having a display window (4) which on its inside has a display screen (5) and in front of which on its outside a transparent second window (6) is provided, a cooling liquid (16) flowing through a space (7) between the display window and the second window from at least one inlet aperture (19) to at least one outlet aperture (17), said space communicating with an expansion vessel. The expansion vessel in the operating condition of the tube is present on the top side of the space and is a gas-filled rigid chamber (20), providing effective compensation for the thermal expansion of the cooling liquid (16) without the flow of cooling liquid being obstructed.

6 Claims, 1 Drawing Sheet

LIQUID-COOLED PROJECTION TELEVISION DISPLAY TUBE WITH EXPANSION VESSEL

BACKGROUND OF THE INVENTION

The invention relates to a projection television display tube comprising an evacuated envelope having a display window which on its inside has a display screen and in front of which on its outside a transparent second window is provided, a cooling liquid which flows through a space between the display window and the second window from at least one inlet aperture to at least one outlet aperture, said space communicating with an expansion vessel.

Such a display tube is disclosed in German Patent Application 3021431 laid open to public inspection to which U.S. Pat. No. 4,529,905 corresponds. A raster is scanned on the display screen, which usually consists of a layer of phosphor or a pattern of different phshors, by means of an electron beam. Due to the electron bombardment, the temperature of the phosphor increases as a result of which the luminous efficiency of the display screen decreases (thermal quenching). This phenomenon occurs in particular in display tubes for projection television in which the display screen is scanned by electron beams with comparatively high beam currents to obtain the required high brightnesses. The temperature of the display window also increases and a temperature gradient is formed in the glass display window. With a high electron beam current and hence a high thermal load this may lead to fracture of the display window. In order to reduce these mechanical stresses in the display window as a result of temperature differences (thermal stress) and to mitigate the reduction of the luminous efficiency, it is known from the already mentioned published German Patent Application 30 21 431 to cool the display window and the display screen connected thereto. In a first described embodiment, a metal cooling member operating as a heat radiator is provided around the first and the second window and the space therebetween filled with coolant. As a result of the rise in temperature of the display window, the cooling liquid heated by the display window flows along the display window upwards and along the second window downwards, as a result of which the thermal energy of the centre of the display window is also dissipated via the cooling member. With a low load, for example less than 5 W, the thermal energy is dissipated mainly via conduction to the second window. At high load the above-described flow of liquid begins to occur with the associated, not very effective, extra cooling by the cooling member. Moreover an embodiment is described in which the cooling liquid is subjected to cooling outside the space. For that purpose the cooling liquid is conveyed by means of flow as a result of temperature differences in the cooling liquid from the top of the space via a tube connected to an outlet aperture to a cooling chamber and, via a second tube, from the cooling chamber to the inlet aperture on the lower side of the space. An embodiment is also described in which an expansion vessel communicates with the space between the first and the second window. This is in the form of bellows which follow the thermal expansion and shrinkage of the cooling liquid. A disadvantage of this bellows construction is that it is complicated and hence expensive.

It is therefore an object of the present invention to provide a simpler and cheaper construction.

SUMMARY OF THE INVENTION

According to the invention, a projection television display tube of the type mentioned in the opening paragraph is characterized in that in the operating position of the tube the expansion vessel is a gas-filled rigid chamber at the top of the space.

The chamber filled with gas, for example, air, easily compensates for the expansion of the coolant. Because the gas is present in the rigid chamber it does not constitute any obstruction for the liquid flow.

A first preferred embodiment of a projection television display tube according to the invention is characterized in that the expansion vessel is a bulge in the outer wall of a duct-like cooling jacket which surrounds the space and which serves as a spacer for the display window and the second window and which interconnects the inlet and outlet apertures of said space.

A projection television display tube having a cooling jacket of this type but without the expansion vessel is described, for example, in European Patent Applications 84200785.8 and 84200784.1 not yet laid open to public inspection.

A second preferred embodiment of a projection television display tube in accordance with the invention is characterized in that the flow resistance in the ducts or the duct of the cooling jacket is smaller than in the said space, and the flow of the cooling liquid in the operating tube is exclusively the result of temperature differences in the cooling liquid (convection flow).

Such a projection television display tube with convection flow is described, for example, in the already mentioned European Patent Application 84200784.1 not yet laid open to public inspection. The said bulge may be provided with a closable filling aperture and/or a vent valve.

BRIEF DESCRIPTION OF THE DRAWING

The invention will now be described in greater detail, by way of example, with reference to the accompanying drawing, in which.

DESCRIPTION OF THE PREFERRED EMBODIMENT

Figure 1:
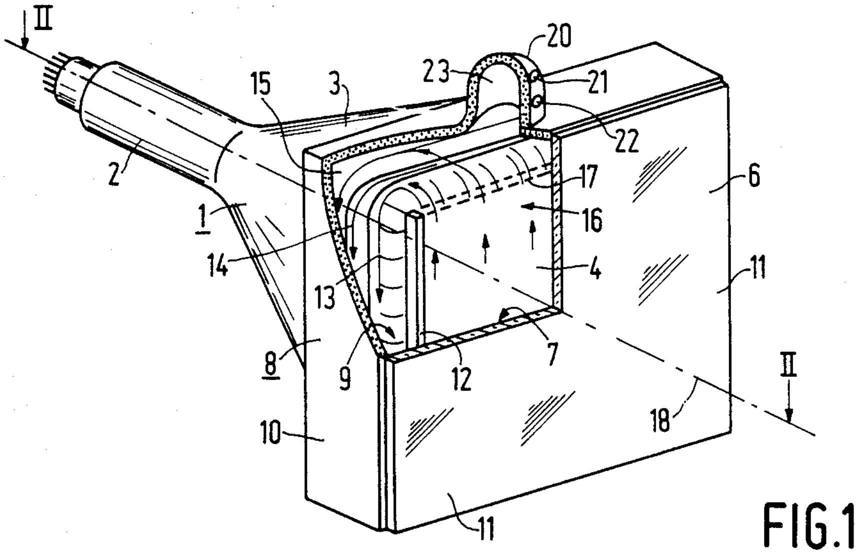
FIG. 1 is a perspective view, partly broken away, of a display tube according to the invention.

FIG. 1 is a perspective view, partly broken away, of a display tube according to the invention. This display tube comprises an envelope 1 consisting of a neck 2, a cone 3, and is sealed by means of a display window 4. A display screen 5 (see FIG. 2) is provided on the inside of the said display window. A transparent second window 6 is provided substantially parallel to and spaced from the outside of the display window 4. A cooling jacket 8 is provided around the tube end at the level of the windows 4 and 6 and an intermediate space 7 defined by two glass spacer strips 12. This cooling jacket comprises a duct 9 which is bounded by an outer wall 10 of the cooling jacket, an internal surface 11 of the second window 6, the two glass spacer strips 12, the external surface of the display tube window 4, the external surface 14 of the cone 3 and a rear wall 15 of the cooling jacket. The space 7 and the duct 9 are filled with cooling liquid 16, for example, water or an ethylene-glycol-water mixture having a lower freezing-point and a higher boiling-point than water. The thermal energy evolved in the display screen is absorbed in the cooling liquid via the display window as a result of which said liquid locally becomes warmer and starts moving towards a higher-level place in the system. The warm cooling liquid leaves the space 7 via the outlet aperture 17 shown in broken lines and enters the cooling jacket 8. In the duct 9 of said cooling jacket the cooling liquid delivers the thermal energy absorbed therein partly to the wall 10 and partly to the rear wall 15 of the cooling jacket and flows back into the space 7 via an inlet aperture which is not visible in FIG. 1 but is shown at 19 in FIG. 3. The direction of flow of the cooling liquid is indicated by arrows. Because the liquid flows around the tube end and is not cooled in separate cooling chamber or heat exchanger, a better temperature equalization is obtained than in systems having a separate cooling chamber. During operation of the tube the cooling liquid expands as a result of the heating. By providing, according to the invention, a gas-filled rigid chamber 20 on the top side of the space 7 instead of the known bellows, an expansion vessel is obtained which does not obstruct the flow. This vessel can be obtained by simple bulge-like deformation of the material. Such a tube in which the space 7 and the duct 9 are both filled with water and with an 80% ethylene glycol 20% water mixture as the cooling liquid and having a display screen with a diagonal of 5" (12.7 cm) showed a rise in temperature of the cooling liquid for the centre of the display screen of only 37±2° C. with a load of 28 W continuous. The cooling jacket comprised cooling fins and was air-cooled but not forced-cooled. Moreover, there was some extra cooling by contact with parts of the device in which the tube was mounted. The rigid chamber 20 comprises an aperture which is closed by a filler cap 21. The rigid chamber also comprises a vent valve 22 with which the quantity of gas (air)23 in the chamber can be controlled. The chamber may be formed, for example, by deep-drawing.

Figure 2:
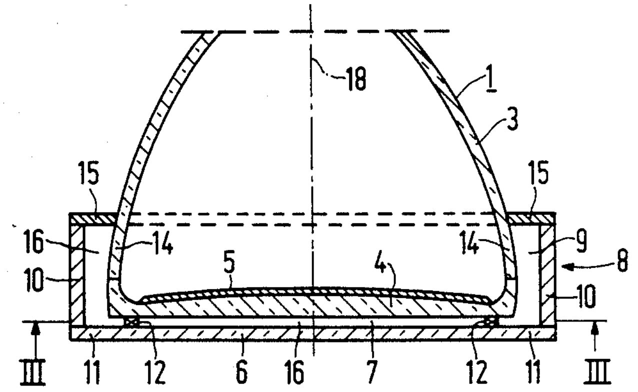
FIG. 2 is a horizontal sectional view through the tube of FIG. 1 taken on the line II—II in FIG. 3.

FIG. 2 is a horizontal sectional view through the FIG. 1 tube which comprises the central tube axis 18. The reference numerals correspond to those of FIG. 1.

Figure 3:
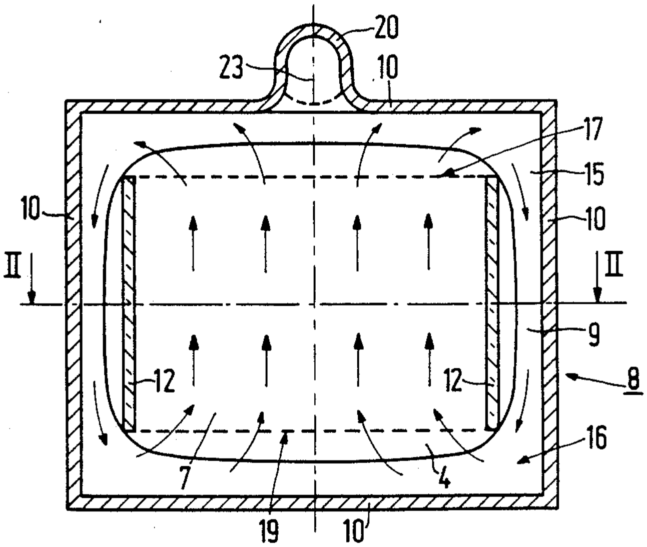
FIG. 3 is a vertical sectional view on the line III—III in FIG. 2.

FIG. 3 is a vertical sectional view at right angles to the tube axis 18. The reference numerals again correspond to those of FIG. 1. The cooling liquid 16 flows through the space 7 upwards and leaves said space via the outlet aperture 17 (broken line) and then flows via the cooling jacket through duct 9 to the inlet aperture 19 (broken line). The liquid flow is not hampered by the gas 23 (above the broken line) in the rigid chamber 20.

Of course, the invention is not restricted to projection television display tubes in which convection liquid flow takes place, but may also be used in projection television display tubes in which the cooling liquid is circulated by pumping.

What is claimed is:

1. A projection television display tube comprising:

an evacuated envelope having a display window; a display screen on the inside of the display window; a transparent second window in front of the display window and forming a space therebetween; a cooling liquid in the space; at least one inlet aperture and at least one outlet aperture communicating with the space; a duct-like cooling jacket surrounding the space and interconnecting the inlet and outlet apertures, the flow resistance in the cooling jacket being smaller than in the space, and the flow of cooling liquid in the operating tube being exclusively the result of temperature differences in the cooling liquid (convection flow); and an expansion vessel communicating with the space, characterized in that the expansion vessel is a gas-filled rigid chamber at the top of the jacket in the operating position of the tube.

2. A projection television display tube as claimed in claim 1, characterized in that rigid chamber is a bulge in the outer wall of the jacket.

3. A projection television display tube as claimed in claim 1, characterized in that the expansion vessel is provided with a closable filling aperture for the cooling liquid.

4. A projection television display tube as claimed in claim 3, characterized in that the expansion vessel is provided with a vent valve.

5. A projection television display tube as claimed in claim 1, characterized in that the expansion vessel is provided with a closable filling aperture for the cooling liquid.

6. A projection television display tube as claimed in claim 1, characterized in that the expansion vessel is provided with a vent valve.

* * * * *